Aug. 13, 1929.  C. E. STARR  1,724,321
TRANSMISSION
Filed May 23, 1927  2 Sheets-Sheet 1
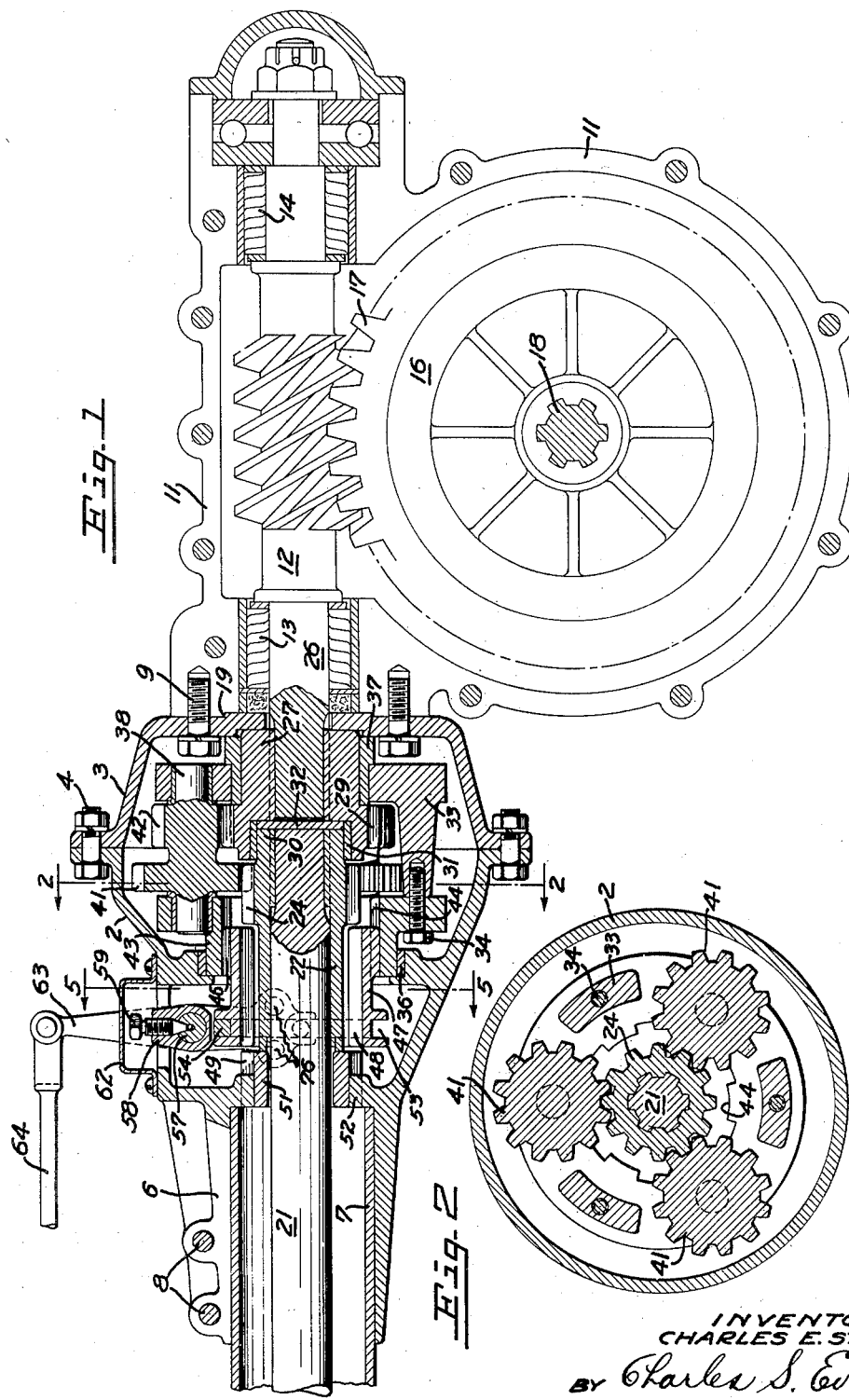
INVENTOR
CHARLES E. STARR
BY Charles S. Evans
HIS ATTORNEY.

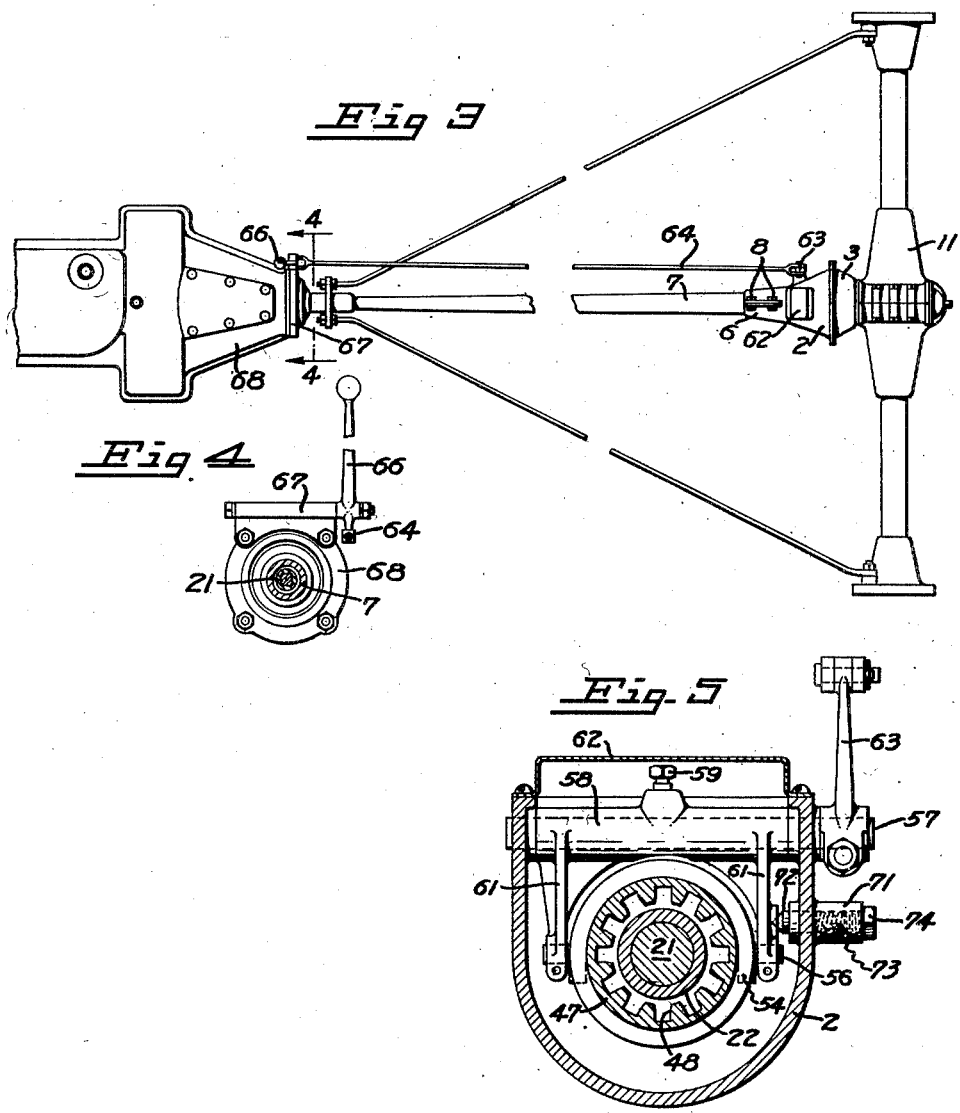

Patented Aug. 13, 1929.

1,724,321

UNITED STATES PATENT OFFICE.

CHARLES E. STARR, OF WHITTIER, CALIFORNIA.

TRANSMISSION.

Application filed May 23, 1927. Serial No. 193,394.

My invention relates to transmissions for motor driven vehicles and particularly to a two-speed transmission adapted to be inserted in the propeller shaft as an auxiliary to the regular transmission, adjacent the motor.

One of the objects of the invention is the provision of an auxiliary transmission for doubling the speeds normally obtainable by the regular transmission, and which is of the jack-shaft type, as opposed to the planetary type.

Another object of the invention is the provision of a transmission of the character described which may readily be inserted in the propeller shaft of a motor driven vehicle, forward of but adjacent to the rear axle housing.

Another object of the invention is the provision of a transmission of the character described having special suitability for use in light trucks.

The invention possesses many other objects and valuable features, some of which will be set forth in the following description of the invention which is illustrated in the drawings forming part of the specification. It is to be understood that I do not limit myself to the showing made by the said description and drawings, as I may adopt varying forms of my invention within the scope of the claims.

Referring to the drawings:

Figure 1 is a vertical sectional view through the transmission, and showing it interposed in the propeller shaft of a truck, the standard worm drive and the rear axle housing of which are shown in light lines.

Figure 2 is a vertical sectional view through the transmission, the plane of section being indicated by the line 2—2 of Figure 1.

Figure 3 is a plan view of the transmission, showing it installed in the rear axle and regular transmission assembly of a light truck.

Figure 4 is an elevation of the lever control for operating the transmission. The torque tube and propeller shaft are shown in section; and the plane in which the view is taken is indicated by the line 4—4 of Figure 3.

Figure 5 is a vertical sectional view through my transmission, the plane of section being indicated by the line 5—5 of Figure 1.

The transmission of my invention comprises a fixed housing, preferably formed of two parts, 2 and 3, held together by the bolts 4. At the left end of the housing, as viewed in Figure 1, a split extension 6 is provided within which the severed end 7 of the torque tube may be clamped by the bolts 8. The opposite end of the housing is secured by cap screws 9 to the rear axle housing 11, within which the worm 12 is journalled in the roller bearings 13 and 14, in the well known manner. The usual differential mechanism 16, having the worm wheel 17 in mesh with the worm, is arranged in the housing 11 to rotate the rear axles of the vehicle, one of which 18 is shown.

It will be understood that in interposing the housing 2—3 in the torque tube, the rear end is disconnected from the rear axle housing and a sufficient portion cut off so that the housing 2—3 may be interposed in the place of the severed part; the rear end of the housing being connected to the rear axle housing on the same flange previously occupied by the end of the torque tube. To facilitate this connection, the rear end of the housing is provided with a face, including the shoulder 19, complementary to the face of the flange.

With the installation of this transmission it is also necessary to cut the propeller shaft of the truck into two parts. On the rear end of the forward part 21 is splined a sleeve 22, having gear teeth 24 formed about the periphery adjacent the rear end thereof. On the forward end of the rear part 26 of the propeller shaft is splined the sleeve 27, having gear teeth 29 formed thereon, adjacent the teeth 24. In order to secure proper alinement of the two shafts, 21 and 26, the end 30 of the sleeve 22 is journalled within the adjacent end of the sleeve 27, a wear-ring 31 and a wear-plate 32 being interposed between the parts.

In a reduction gearing the gear 24 is smaller than the gear 29; and for convenience the shaft 21 may be referred to as the driving shaft and the shaft 26 as the driven shaft. In like manner the gear 24 becomes the driving gear and the gear 29 the driven gear.

Journalled within the housing 2—3, concentrically with the shafts 21 and 26, is a cage or rotor 33, preferably formed in two parts, connected together by the cap screws 34. Wear-rings 36 and 37 are preferably interposed between the bearing surfaces. In order to keep the peripheral velocity of the rotor as low as possible, the rotor journal should be the least possible diameter. Both sides of the rotor may be journalled in the fixed housing, but I prefer to journal the left hand side of the rotor as viewed in Figure 1 in the fixed housing; and the right hand side is preferably journalled on the sleeve 27. Journalled within the rotor, on axes parallel to the axis of the driving and driven shafts, are preferably three jack-shafts 38, each provided with preferably integrally formed gears 41 and 42, in mesh respectively with the gears 24 and 29. The axes of the several pairs of connected gears are equi-distant from the axis of the driving and driven shafts, but obviously the gears 41 are of greater diameter than the gears 42. A single pair of connected gears 41 and 42 arranged as shown in Figure 1 would give the required reduction, but in order to equalize the stresses and prolong the life of the mechanism, three pairs of gears are preferred. Means are provided for optionally preventing rotation of the rotor or preventing axial rotation of the connected gears 41 and 42. In the first case, holding the rotor in fixed position causes the connected gears 41 and 42 to function as jack-shaft gears, transmitting motion from the gear 24 to the gear 29 at reduced velocity. In this case rotation of the jack-shaft gears is about a fixed axis, there being no orbital or bodily movement of the jack-shaft gears. In the second case, preventing rotation of the connected gears 41 and 42 about their common axis causes them to function as a lock between the two gears 24 and 29 so that the gears 24 and 29 revolve together at the same velocity. In this case the jack-shaft gears do not function as gears but as a lock, and their motion is a lunar one about the axis of the shafts 21 and 26. Formed on the left hand side of the rotor as viewed in Figure 1 is a projecting annular flange 43 on the inside surface of which are cut clutch teeth 44. Slidably mounted within the flange and having teeth 46 in permanent engagement with the teeth 44 is a sleeve 47, also provided on its inner surface with clutch teeth 48. These clutch teeth 48 may conveniently be formed as gear teeth, although they do not function as such and at one end are adapted to be engaged with the teeth of the gear 24, the engaged portion of the gear teeth 24 serving as clutch teeth. When such engagement occurs, by movement of the sleeve 47 to the right the sleeve 22 and rotor are rigidly locked together so that the rotor and shaft 21 rotate as one. Of course this prevents axial rotation of the jack-shaft gears, with the result that the shafts 21 and 26 are locked together for rotation as one because of the interlocked gears.

Movement of the sleeve 47 in the opposite direction, that is to the left as viewed in Figure 1, engages the left hand ends of the clutch teeth 48 with clutch teeth 49, formed on a ring 51 set rigidly within the flange 52 of the housing part 2. When this movement takes place the sleeve 47, while remaining in engagement with the rotor flange 43, interlocks with the fixed teeth 49 so that the rotor is locked to the fixed housing and prevented from rotation. When this occurs the axes of the jack-shaft gears are fixed; and the jack-shaft gears function as such, transmitting motion at reduced velocity from the driving shaft gear 24 to the driven shaft gear 29.

Means are provided for shifting the sleeve 47 axially in either direction. On the end of the sleeve opposite the teeth 46 are a pair of flanges enclosing an annular groove 53 within which is journaled a part ring 54, having trunnions 56 arranged thereon as shown in Figure 5. Journalled in the housing 2 on an axis above and transverse to the shaft 21 is a shaft 57. On that portion of the shaft within the housing, a yoke 58 is fixed by the screw 59, and is provided with yoke arms 61 slotted over the trunnions 56. In order to facilitate the assembly of the parts, the housing 2 above the shaft 57 is recessed and a cover plate 62 is secured over the recess after the assembly of the parts. On that portion of the shaft 57 extending from the housing, a lever arm 63 is rigidly secured and is connected by a link 64 with a control lever 66 extending upwardly through the floor of the vehicle and pivotally mounted within the bracket 67, preferably secured on the rear face of the regular transmission housing 68.

Means are provided for resiliently retaining the sleeve 47 in either one of its engaged positions. Arranged on the side of the housing 2 is a hollow boss 71 in which a pointed pin 72 is slidably disposed. A spring 73 is interposed between the inner end of the pin and a plug 74 threaded into the end of the boss so that the pin is resiliently pressed into either of the seats 76 as the case may be.

Figure 1 shows the transmission in neutral, that is, with the sleeve 47 in engagement with neither the teeth 24 nor the teeth 49. From the above it will be understood that by manipulation of the control lever 66 the sleeve may be shifted into either one of its extreme positions so as to lock the rotor to the fixed housing or to the gear 24. In the latter case the two shafts 21 and 26 are locked for rotation together, without speed reduction, and the range of available speeds is therefore that provided by the regular transmission within the housing 68. In the former case the jack-shaft gears effect a speed reduction determined by the proportion of the gears 24—41—42—29. Therefore each of the speeds provided by the regular transmission may be transmitted unchanged to the shaft 26 or transmitted at reduced velocity to the shaft 26, at the option of the driver, so that with the installation of my auxiliary transmission, the range of speeds provided by the regular transmission is doubled.

I claim:

1. A gear transmission comprising a driving shaft, a driving gear fixed for rotation with said driving shaft, a driven shaft, a driven gear fixed for rotation with said driven shaft, a fixed element, a pair of gears fixed for equal rotation together and meshing respectively with the driving and driven gears, a rotor in which the pair of gears is journaled and having one journal bearing on said fixed element and another journal bearing on one of the shafts, and means for optionally preventing rotation of the rotor or axial rotation of the pair of gears.

2. A gear transmission comprising a driving shaft, a sleeve fixed for rotation with the driving shaft and having a driving gear thereon, a driven shaft, a sleeve fixed for rotation with the driven shaft and having a driven gear thereon, an end of one sleeve being journaled within the adjacent end of the other sleeve, connected gears in mesh with the driving shaft gear and the driven shaft gear, a rotor in which the connected gears are journaled, means for journaling the rotor, and means for optionally preventing rotation of the rotor or axial rotation of the connected gears.

In testimony whereof, I have hereunto set my hand.

CHARLES E. STARR.